Sept. 5, 1967  W. BOCK ET AL  3,339,222
WINDSHIELD WIPER ARM
Filed Jan. 25, 1965  2 Sheets-Sheet 1
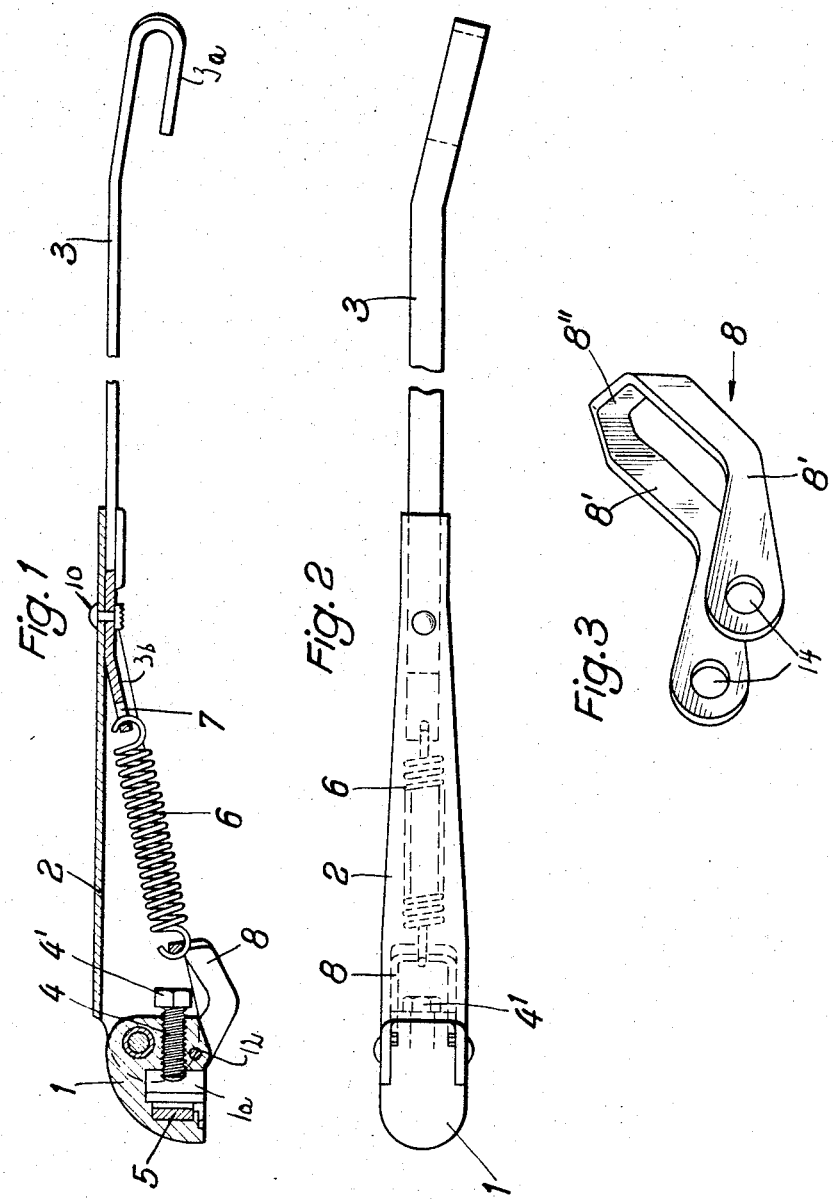
Inventor:
WILLY BOCK
KURT BAUER
HANS CHRISTIAN DEUTSCHER
By McGlew and Toren, Attorneys

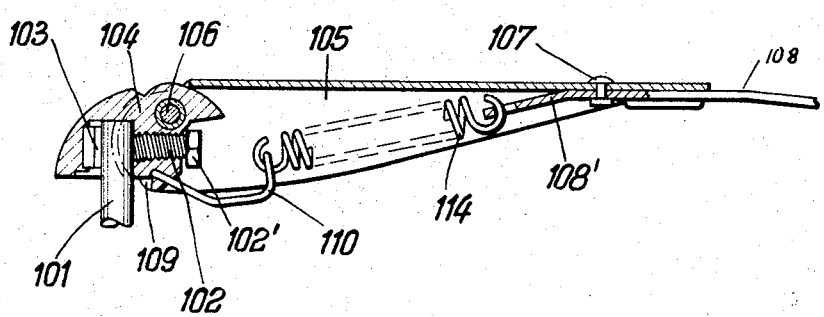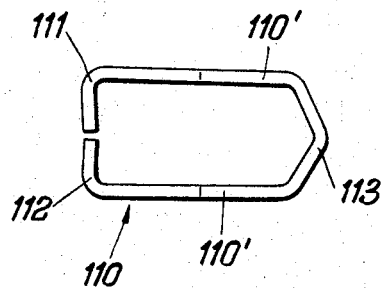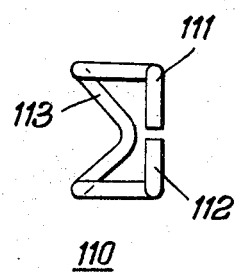

United States Patent Office 3,339,222
Patented Sept. 5, 1967

3,339,222
WINDSHIELD WIPER ARM
Willy Bock, Bietigheim, Kurt Bauer, Kleiningersheim, and Hans Christian Deutscher, Ludwigsburg, Germany, assignors to SWF—Spezialfabrik fur Autozubehoer Gustav Rau G.m.b.H., Bietigheim, Wurttemberg, Germany
Filed Jan. 25, 1965, Ser. No. 427,550
Claims priority, application Germany, Feb. 5, 1964, S 89,377; June 3, 1964, S 91,356
5 Claims. (Cl. 15—250.35)

This invention relates in general to windshield wiper construction, and particularly to a new and useful windshield wiper with means for biasing a wiper blade supporting arm in a direction toward the windshield for urging the wiper blade into an operative position, and for also biasing the wiper arm into a folded away upward position when it is desired to have access to the windshield.

Windshield wipers are known which include a pressure plate for pivotally mounting the wiper arm which is clamped by means of a screw to the wiper drive shaft. The wiper arm which is adapted to carry the wiper blade is pressed against the windshield by means of a helical compression spring which bears on one end on the wiper arm and with its other end on an intermediate member designated as a spring support which, in turn, is carried on a projection of the pressure plate. In such an arrangement the intermediate member is arranged above the securing screw for the pressure plate and close to the back of the wiper arm, so that the wiper arm cannot be folded away from the windshield without being hindered by the screw and it will remain in the folded position until turned again by hand beyond the dead center position toward the windshield. Such a windshield wiper with a helical compression spring biasing means has the disadvantage, however, that the helical compression spring bulges and presses against the wiper arm due to the constant vibrations of the vehicle and thus causes a reduction in the wiping pressure and impairs the wiping pattern after each major vibration. The known embodiments without helical springs have the great disadvantage that the wiper arm cannot be folded beyond dead center position away from the windshield and it therefore does not remain in the folded position. Because of this, helical compression springs are therefore always used in windshield wipers which are clamped with a screw on the wiper shaft.

In accordance with the present invention, there is provided a wiper construction in which the wiper blade carrying arm is biased both when it is in a downward operative position and in an upward folded away position by means of a helical tension spring which is supported in a manner such that it does not in any way interfere with the operative parts. In a preferred arrangement, there is provided a pressure plate which is adapted to be clamped to the wiper drive by means of a clamping screw or bolt element. A substantially U-shaped intermediate member is pivotally supported at its one end on the pressure plate and has its outer end angled upwardly toward a downwardly bent extension of the wiper blade supporting arm. The intermediate member and the end of the supporting arm form a support for a biasing spring which is advantageously a helical tension spring. The intermediate member is advantageously of U-shaped configuration having two legs which extend on each side of the pressure plate and are articulated thereon. The legs are spread apart sufficiently to insure that they do not interfere with the clamping screw for clamping the pressure plate on the wiper shaft. Each leg portion of the U-shaped member is made substantially V-shaped or they extend in an arc downwardly from the wiper pressure plate and then upwardly toward the downwardly bent extension of the wiper arm for securing the opposite end of the spring. In this manner there is no possibility that the biasing spring or the intermediate member will rub against any other part during the operation of the windshield wiper or when the wiper is moved to a folded-up position. It is also advantageous to have the intermediate member bent in its axis of symmetry, so that the end of the helical tension spring which is held at such location always acts in the plane of symmetry of the intermediate member and thus of the wiper arm so that rubbing of the helical tension spring on any part of the wiper is avoided.

In accordance with another embodiment of the invention, the intermediate member is formed from a wire clip element or strap preferably of a spring-loaded wire material bent in a manner such that its free ends may engage in recesses defined on the pressure plate and be pivotally supported therein. Such a construction results in a substantial cost reduction in the overall wiper blade manufacture. The recesses or bores in the wiper blade pressure plate for supporting the intermediate member may be made during the casting or forming of this part. Because of the resilient characteristics of such a clip, there is no danger that permanent deformations will take place during the folding and operative positioning of the wiper blade. The intermediate member wire element may advantageously be made so that its free ends are closely spaced so that they must be spread apart in order to insert them into the recesses in the pressure plate. In addition, in order to avoid a canting of the free ends during the insertion of the recesses of the pressure plate, it is advantageous to incline the center axes of the two free ends of the wire elements toward each other at an obtuse angle which is so selected that the free ends form a common center axis after insertion into the pressure plate.

Accordingly, it is an object of this invention to provide a wiper blade mount including the usual pressure plate which is adapted to be secured to a wiper drive shaft by means of a clamping bolt and which includes means for biasing the wiper blade supporting arm both when it is in an operative position and when it is in a folded-up position.

A further object of the invention is to provide a wiper blade construction having a pressure plate which is adapted to be clamped to a drive shaft for the wiper blade by means of a clamping bolt and which includes an intermediate member which is concavely formed so that it, together with a downwardly or inwardly extending extension of the wiper blade supporting arm, forms a means for supporting a biasing spring therebetween which always acts in the plane of symmetry of the intermediate member and thus of the wiper arm so that rubbing of the associated parts is avoided.

A further object of the invention is to provide an improved wiper construction including a clip element formed as an intermediate member for supporting one end of a helical biasing spring in a manner permitting it to function to bias the wiper blade supporting arm in both operative and non-operative positions and without interfering with the other parts of the blade.

A further object of the invention is to provide a wiper blade construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a longitudinal sectional view through a windshield wiper arm constructed in accordance with the invention;

FIG. 2 is a top plan view of the wiper indicated in FIG. 1;

FIG. 3 is a side perspective view of an intermediate member employed on the wipers indicated in FIGS. 1 and 2;

FIG. 4 is a longitudinal sectional view similar to FIG. 1 of another embodiment of the invention;

FIG. 5 is a top plan view of an intermediate wire strap of the wiper indicated in FIG. 4; and FIG. 6 is an end elevational view of the wire strap indicated in FIG. 5.

Referring to the drawings in particular, the invention embodied in FIGS. 1 to 3 comprises a wiper arm which includes a pressure plate 1 having a bore 1a for receiving a driving shaft for the windshield wiper (not shown) which is secured in position in the bore 1a against a U-shaped clamping plate 5 by means of a clamping bolt or threaded member 4 having a head 4'. A U-shaped member or head 2 is pivoted on the pressure plate 1 at one end and carries a wiper blade supporting arm 3 at its outer end which is secured thereto such as by a rivet 10. The supporting arm 3 has an outer bent-over end 3a which is adapted to carry the wiper blade and it includes an inner end having a bent-off portion 3b which is angled downwardly toward the lower portion of the pressure plate 1.

In accordance with the invention, the head 2 and the supporting arm 3 are provided with the necessary wiping pressure by means of a helical tension spring 6. The spring 6 is engaged at one end through a bore 7 to the bent-off projection 3b, and an opposite end is secured around a central web 8" of an intermediate member generally designated 8. The intermediate member 8 includes leg portions 8', 8' on each side of the web 8" spaced apart sufficiently to permit them to be engaged around each side of the pressure plate 1 on which the member 8 is pivotally mounted. The intermediate member is pivotally mounted such as by bolts or rivet bolt elements 12 which extend through eyelets 14 of the intermediate member.

The intermediate member 8 is constructed such that the spacing between the legs 8', 8' is always greater than the diameter of the head 4' of the bolt 4. In order to further insure that there is no rubbing of the head 4' on the two legs 8', 8' of the intermediate member 8, even with unfavorable manufacturing tolerances, the two legs are formed with a downwardly curved concavity, substantially V-shaped, as indicated. The legs 8', 8' always expose the head 4' of the screw on all sides in the operating position of the wiper arm indicated in the drawings. In addition, the web 8" of the intermediate member 8 is bent upwardly in its axis of symmetry, i.e. it is formed with a V-shape (inverted in respect to the V-shaped configuration of the arms 8', 8'). In this manner the end of the helical tension spring 6 is always supported at the uppermost corner of the intermediate member 8. This insures that there will be no rubbing of spring 6 on the walls of the wiper arm head 2. Because of the U-shaped configuration of the intermediate member 8 it is easily possible to fold the wiper arm so far away from the windshield that it remains in the folded position and is biased in such a position until it is turned backwardly again by hand toward the windshield.

The screw 4 for fastening the windshield wiper on the wiper drive shaft is used for most windshield wipers because of the extremely simple fastening method.

In the embodiment of FIGS. 4 to 6, a wiper drive shaft 101 is indicated in a recess 103 of a pressure plate 104 and is anchored in position by means of a clamping screw or bolt 102, which may be adjustably threaded into a threaded bore of the pressure plate 104. The pressure plate is advantageously a die cast part made of light metal and provides a base for the pivotal connection of a metal cap or head 105 at a pivot member or bolt 106. The cap 105 carries at its outer end the wiper blade supporting arm 108 which has an inwardly bent portion 108' as in the other embodiment. A rivet 107 secures the supporting arm 108 to the head 105.

In accordance with this embodiment of the invention, an intermediate member 110 comprises a bent wire or strap element having free ends 111 and 112 which engage in a recess or bearing opening 109 defined on each side of the pressure plate 104. The free ends 111 and 112 are spaced apart only by a small amount in their unstressed state so that the leg portions 110', 110' must be spread outwardly from the connecting web or bridge portion 113 in order to insert the legs 111 and 112 within the recess 109. The web portion 113 is bent upwardly from a downwardly extending intermediate portion of the legs 110'. A helical tension spring 114 is supported between the bent off portion 108' and the web portion 113 of the intermediate member 110 as in the other embodiment.

As best indicated in FIG. 5, the leg portions 111 and 112 of the intermediate member 110 are constructed so that they form an obtuse angle, that is, they are bent inwardly, in the view indicated, so that an approximately parallel position of the free ends can be achieved in the recess 109 of the pressure plate 104 after insertion under initial stress of the two leg portions. In this manner the intermediate member may be pivotally suspended from the pressure plate 104 with a minimum of frictional contact. The bending points of the wire strap formation for the intermediate element 110 are rounded off in a well known manner.

As a material for the wire strap it is preferable to use a spring steel wire of about 1½ mm. in diameter. For certain uses, however, the wire strap as well as the pressure plate can be made of plastic with corresponding technological properties.

While specific embodiments of the invention have been shown and described in detail to illustrate the application of the inventive principles, it will be understood that the invention may be embodied otherwise without departing from such principles.

What is claimed is:

1. In a windshield wiper, particularly for motor vehicles, of the type including a wiper arm head having a bore for receiving a wiper drive shaft, a wiper blade supporting arm structure including a substantially trough-shaped inner end pivotally mounted on and at least partially embracing the wiper arm head, an extension projecting from an intermediate portion of the supporting arm structure and inwardly toward the wiper arm head, a clamping screw threaded in the wiper arm head and engaging the drive shaft to clamp the wiper arm head to the drive shaft, the screw having a screw head within the trough-shaped inner end of the supporting arm structure, and tension spring means connected between the wiper arm head and the extension in a manner such as to stably bias the supporting arm structure either to a position pressing the wiper blade against the windshield or to a position in which the supporting arm structure is folded away from the windshield about its pivot axis: the improvement in which said tension spring means comprises a substantially U-shaped intermediate member having a pair of substantially parallel legs pivoted to said head at an axis spaced inwardly from the pivot axis of said arm structure and embracing a part of said head, and having a substantially V-shaped bight interconnecting said legs; and a tension spring connected at one end to said extension and at the other end to the apex of said bight for centering by said apex; said legs providing free access to said screw head in the operative position of the windshield wiper.

2. In a windshield wiper, the improvement claimed in claim 1, in which said legs are bent intermediate their ends in planes parallel to the axis of the wiper drive shaft, to form diverging leg portions.

3. In a windshield wiper, the improvement claimed in claim 1, in which said intermediate member is formed of resilient wire, the free ends of said legs having bent ends directed toward each other and engaged in recesses in said head, the recesses coinciding with the pivot axis of said intermediate member.

4. In a windshield wiper, the improvement claimed in claim 3, in which the distance between the bent ends of said legs is such that, when the latter are engaged in said recesses in said head, they are under inward pressure.

5. In a windshield wiper, the improvement claimed in claim 4, in which said bent leg ends, in the relaxed state before they are engaged in said head, extend at an obtuse angle toward each other, the apex of said angle being toward the apex of said V-shaped bight; said obtuse angle having a relatively large value so that said bent ends, after insertion into said head, are substantially coaxial.

References Cited

UNITED STATES PATENTS

| 2,860,364 | 11/1958 | Krohm | 15—250.34 |
| 3,011,200 | 12/1961 | Bignon | 15—250.34 |

FOREIGN PATENTS

| 1,224,190 | 2/1960 | France. |
| 636,637 | 5/1950 | Great Britain. |

CHARLES A. WILLMUTH, *Primary Examiner.*